United States Patent [19]
Curtiss et al.

[11] 3,988,258
[45] Oct. 26, 1976

[54] RADWASTE DISPOSAL BY INCORPORATION IN MATRIX

[75] Inventors: Derry H. Curtiss; Harold W. Heacock, both of Kennewick, Wash.

[73] Assignee: United Nuclear Industries, Inc., Richland, Wash.

[22] Filed: Jan. 17, 1975

[21] Appl. No.: 541,935

[52] U.S. Cl. .................................... 252/301.1 W
[51] Int. Cl.² ........................................ G21F 9/20
[58] Field of Search ........................... 252/301.1 W

[56] References Cited
UNITED STATES PATENTS
3,837,872  9/1974  Conner ................................. 106/74
FOREIGN PATENTS OR APPLICATIONS
1,246,848  10/1960  France 938,211  9/1963  United Kingdom ......... 252/301.1 W

OTHER PUBLICATIONS

Butt et al. "Cementation of Hydroxide Pbts. Containing Certain Rad. Elements" Soviet Atomic Energy (USSR) vol. 17, No. 2 (1964) pp. 832–837.

*Primary Examiner*—Leland A. Sebastian
*Assistant Examiner*—Deborah L. Kyle

[57] ABSTRACT

A process of safe disposal, handling or storage of radwaste associated with nuclear power production is described. A feature of the invention is to incorporate the radwaste in a hardenable, matrix-forming mass employing a cement-type binding agent to which alkali or alkaline-earth silicate is added, among other things, to increase liquid absorption.

9 Claims, No Drawings

RADWASTE DISPOSAL BY INCORPORATION IN MATRIX

This invention relates to disposal of radwaste associated with nuclear power production processes.

Conventional nuclear power producing facilities employ coolants which acquire radioactively-contaminated dissolved and particulate impurities through neutron interactions or from defective fuel elements. Other sources of contaminated liquids or solids are also present in such facilities. Such contaminants are removed from liquids by filters and ion-exchange beds. The radioactively-contaminated solids and liquids generated from such treatments are termed "radwaste," and most commonly comprise spent demineralizer resins, waste evaporator concentrates, disposable filter cartridges, filter sludges, and neutralized chemical wastes. Safety considerations require a process for handling radwaste for temporary storage, and for shipment to licensed burial grounds for long term storage.

Among the processes currently in use are incorporation of the radwaste into a free-standing, solid matrix using a binding agent, such as cement or urea formaldehyde. Cement is the preferred binding agent over organic materials because cement is non-combustable and resistant to chemical and biological attack, offering important safety advantages over the resin binding agent, and because cement is inexpensive and available in insured supply.

However, a number of problems have been encountered in radwaste disposal by incorporation in a matrix using a cement-type binding agent. One problem is the narrow range of liquid tolerence permitted to ensure hardening of the cement, requiring large volumes of cement relative to the volume of waste treated, which leads to poor shipping efficiency (defined as the number of pounds of liquid waste per cubic foot of solid shipped) and high cost. Another problem is that long mixing times of the waste-cement mixture are necessary to ensure uniform distribution of aggregate waste-solids until the cement sets, which also increases cost. Still a further problem is that boric acid wastes common to pressurized water reactors (the primary coolant in the typical PWR contains boric acid as a chemical shim for reactivity control) cannot be directly solidified using cement, but must first be absorbed in drying materials such as vermiculite, which also increases cost and reduces shipping efficiency. Another problem encountered from time to time is contraction during hardening of the waste-cement mixture causing undesirable fissures in the solid and release of contaminated liquid.

The principal object of the present invention is a process for radwaste disposal by incorporation in a matrix employing a cement-type binding agent in which the problems enumerated above are overcome or mitigated.

It has been found, in accordance with the process of the present invention, that the addition of alkali or alkaline earth silicate to the radwaste-cementing material mixture produces a number of unexpected benefits and important advantages over the known radwaste disposal process. These include:

1. direct solidification of all common nuclear power industry radioactive wastes, including boric acid solutions;

2. rapid hardening to a gel in less than 2 minutes, eliminating requirements for continuous mixing to insure homogeniety;

3. solidification of maximum hardness in less than 7 days, compared to 28 days for cement alone without the alkali silicate additive;

4. increased water retention over non-silicated processes due to the high capacity of silicates for water fixation by hydration;

5. production of more fluid mixes causing ready adaptability to batch or continuous processing of radioactive wastes, and 7. minimum operator training and control required to obtain solidified wastes in a form suitable for safe handling and shipment.

These and further objects and advantages of the invention will be better understood from the following detailed description of several preferred embodiments and examples, which are not to be considered as limiting, in accordance with the invention.

Reference is first made to a recent paper by A. H. Kibbey and H. W. Godbee entitled "A Critical Review of Solid Radioactive Waste Practices at Nuclear Power Plants," published March 1974 in ORNL-4924, which describes in great detail the sources and kinds of radwaste, the known methods using cementing materials and organic resins for matrix incorporation, the advantages of cements over organic resins, as well as illustrating in block form typical systems for treatment of radioactive wastes at boiling water and pressurized water reactor facilities. Thus there is no need to detail how the radioactive wastes are obtained for purposes of the present invention, except to note that it ultimately is formed into a slurry or liquid solution for mixing with a cementing material. The wastes can be allowed to accumulate for batch processing or may be processed continuously, both processes as such having been used with other cementing materials.

In a typical batch process, dewatered wastes are collected in the waste mixing tanks. Concentrated liquid waste is mixed with the dewatered waste forming a slurry, and this slurry is pumped at a controlled rate to an in-line mixing pump. The dry cementing material is also added to the mixing pump. After suitable mixing, a cement-waste mixture is formed that is homogeneous. Details on suitable proportions will be later given, but in general the cement-waste mixture contains excess liquid above normal construction concrete proportions. It is preferred to add the alkali or alkaline earth metal silicate by injection as a solution subsequent to formation of the waste-cement mixture. This is conveniently done by adding the silicate to the waste-cement stream as it is fed into a suitable container where it is allowed to harden. A preferred container is a radiation shielding container such as a steel drum, though other materials, such as concrete, can also be used for the container.

Cementing materials that can be used in the process of the invention include Portland cement (all types), natural cement (all types), masonry cement (all types), gypsum, gypsum cement or plaster, Plaster of Paris, lime (slaked or unslaked), and Puzzolans, all materials which harden by a combination of hydrolysis and hydration reactions upon the addition of water. The preferred cementing material is Type II Portland cement, as it is inexpensive and easily obtainable.

While in general any alkali or alkaline earth silicate can be employed as the additive, sodium silicate is the preferred additive because of its low cost and ready availability.

The proportions of the radwaste-cement-additive mixture can be varied over a rather wide range. In general, for solidifying 100 parts (by weight) of radwaste, it is preferred to use 20–100 parts (by weight) of the cementing material, and 5–50 parts (by weight) of the silicate additive. The silicate additive will preferably constitute 3–15% by weight of the final mixture. Since in the radwaste disposal process the emphasis is on increased liquid fixation in the solidified product allowing a maximum of waste to be incorporated into a minimum final volume, it is preferred to use relatively high proportions of the silicate additive, constituting at least 20% by weight of the combined cement-additive weight. What is optimum for certain wastes may not be optimum for other wastes, but simple experimentation with different waste samples will enable those skilled in this art to arrive at optimum proportions with little effort. The examples given below demonstrate suitable proportions that have been found to produce excellent results for different typical wastes from various nuclear power plants. The examples given in Table I below are for solidification of 100 parts (all by weight) of the waste described, employing a Type II Portland cement and sodium silicate obtained commercially as 41° Be sodium silicate, which is a water solution of $Na_2SiO_3$ having a density of 1.35–1.45 grams/cu. cm. (41° is a hydrometer reading in Baume degrees):

Table I

| | Waste 100 Parts | Cement | 41° Be $Na_2SiO_3$ |
|---|---|---|---|
| 1. | Boric Acid Waste-up to 12% $H_3BO_3$ adjusted to pH with NaOH | 70 | 25 |
| 2. | Waste Water-dissolved solids approximately equal to raw water | 50 | 10 |
| 3. | $Na_2SO_4$ Waste Solution-up to 25% $Na_2SO_4$ with pH approximately 7 | 50 | 10 |
| 4. | Water Slurry of Spent Ion Exchange Bead Resins | 25 | 5 |
| 5. | Water Slurry of Spent Ion Exchange Powder Resin | 25 | 10 |

In the examples given in Table II below, the formulations are based on pounds per cubic foot of solid produced. The cement and additive used were the same as in Table I:

Table II

| | Waste | Waste | Cement | Sodium Silicate |
|---|---|---|---|---|
| 6. | Waste evaporator bottoms | 44.6 | 31.2 | 8.3 |
| 7. | Regenerant evaporator bottoms | 56.6 | 25.5 | 5.9 |
| 8. | Filter cake Included evaporator bottoms | 35 | 20.7 | 6.2 |
| 9. | Spent bead resins Included evaporator bottoms | 43 10.5 | 23.1 | 5.8 |
| 10. | Powdex/solka floc Included evaporator bottoms | 32 23 | 18 | 9 |

As mentioned above, the equipment for carrying out the process of the invention is similar to that employed for other known processes using cement alone or resin as the binding agent. Waste mixing tanks and feed pumps are used to prepare the waste and feed the waste at a controlled rate to an in-line mixer. The wastes themselves normally include sufficient liquid to form a very fluid slurry. If not, additional liquid can be added as needed. The silicate itself is conveniently added as a liquid solution. It mixes readily with the very fluid slurry of cement and waste. Mixing can be carried out in the in-line mixer, but because the final waste-cement-silicate slurry gells quickly, it is preferred to add the silicate solution as the waste-cement slurry is introduced into a suitable disposable container, such as a steel drum, which provides additional radiation shielding as well as a convenient shipping container for the solidified mass. The silicate can be added at the container fillport, for example, through a concentric tube in the fillpipe, similar to the manner by which the catalyst is added to resin mixes. If the pH of the waste is acidic, it is preferred to neutralize or make same slightly basic by addition of a suitable base, such as NaOH. Formulated on the basis of volume flow, at a waste flow of 7.5 gpm, a typical cement-silicate flow is 45.4 pounds per minute of Portland cement and 1.0 gpm of sodium silicate flow. At these rates, a 50 cu. ft. container is filled in about 40 minutes. Gelling begins in about 2 minutes after filling of the container. Solidification to maximum hardness occurs in less than 7 days. The result is a free-standing solid with no surface liquids which is safe for handling, shipment, or long term storage at licensed buriel grounds.

The principal benefits secured by the use of the silicate additive is to broaden the narrow liquid tolerence of the usual cements, and in particular increase the liquid absorption thereby improving shipping efficiency, increase container utilization by eliminating waste mounding as a result of the more fluid mix, and enable solidification of wastes such as concentrated borate solutions that could not be solidified heretofore with a cement binding agent. While we do not wish to be bound by the following explanation, we believe the above results are in part due to the added silicate increasing the number of hydration sites available to chemically bind water into the solid product thereby increasing the volume of liquid that can be incorporated into a solid with a given quantity of cementing material. Also, it is believed that the silicate additive catalyzes the cement hardening process by enhancing intermolecular bonding through hydrolysis reactions.

While our invention has been described in connection with specific embodiments thereof, those skilled in the art will recognize that various modifications are possible within the principles enunciated herein and thus the present invention is not to be limited to the specific embodiments disclosed.

What is claimed is:

1. In a method of processing radioactive wastes wherein a slurry of radioactive wastes and a cementing material is formed in a mixer and the slurry then transferred from the mixer to a storage and shipping container and allowed to harden therein, the improvement of increasing shipping efficiency by including in the slurry before hardening an alkali or alkaline earth metal silicate, and for each 100 parts by weight of the waste included in the slurry adding 25–70 parts by weight of the cementing material and 5–25 parts by weight of the silicate.

2. The process of claim 1 wherein the shipping container is a steel drum.

3. The process of claim 2 wherein the cement is Portland cement and the silicate is sodium silicate, and for each 100 parts by weight of waste present there is present 25–70 parts by weight of the cement and 5–25 parts by weight of the silicate.

4. A method of processing radioactive wastes for storage or shipment as claimed in claim 1, wherein the silicate is included in the slurry before it is transferred to the container.

5. A method of processing radioactive wastes for storage or shipment as claimed in claim 1, wherein the silicate is added to the slurry while it is being transferred to the container.

6. A method of processing radioactive wastes for storage or shipment as claimed in claim 1, wherein the added silicate constitutes at least 20% by weight of the combined cement and silicate.

7. A method of processing as claimed in claim 6 wherein the added silicate constitutes 3–15% by weight of total composition.

8. A method of processing radioactive wastes for storage or shipment as claimed in claim 1, wherein the cementing material is Portland cement.

9. A method of processing radioactive wastes for storage or shipment as claimed in claim 1, wherein the silicate is sodium silicate.

* * * * *